US012608806B2

(12) United States Patent
Duffy et al.

(10) Patent No.: US 12,608,806 B2
(45) Date of Patent: Apr. 21, 2026

(54) AUTOMATED MEDICAL IMAGE QUALITY CONTROL SYSTEM

(71) Applicant: Subtle Medical, Inc., Menlo Park, CA (US)

(72) Inventors: Ben Andrew Duffy, Palo Alto, CA (US); Tao Zhang, Menlo Park, CA (US)

(73) Assignee: Subtle Medical, Inc., Menlo Park, CA (US)

( * ) Notice: Subject to any disclaimer, the term of this patent is extended or adjusted under 35 U.S.C. 154(b) by 330 days.

(21) Appl. No.: 18/297,382

(22) Filed: Apr. 7, 2023

(65) Prior Publication Data

US 2023/0245314 A1 Aug. 3, 2023

Related U.S. Application Data

(63) Continuation of application No. PCT/US2021/059480, filed on Nov. 16, 2021.

(Continued)

(51) Int. Cl.
*G06K 9/00* (2022.01)
*G06T 7/00* (2017.01)

(52) U.S. Cl.
CPC .. *G06T 7/0014* (2013.01); *G06T 2207/20081* (2013.01); *G06T 2207/20084* (2013.01);
(Continued)

(58) Field of Classification Search
CPC ......... G06T 7/0014; G06T 2207/20081; G06T 2207/20084; G06T 2207/20092; G06T 2207/30168; G06T 7/0012–0016; G06T 2207/10064–10136; G06T 2207/30004–30104; G06T 9/002; G06T 5/60; G06T 7/33; G06T 7/337; G06T 7/30; G06T 7/344; G06T 3/0068; G06N 3/045; G06N 3/048; G06N 3/08; G06N 3/02–126; G06N 20/00–20; G06V 2201/03–034;
(Continued)

(56) References Cited

U.S. PATENT DOCUMENTS 10,499,857 B1 * 12/2019 Nguyen ................. G06N 3/045
10,716,515 B2 7/2020 Gustafsson et al.
(Continued)

FOREIGN PATENT DOCUMENTS

CN 110858315 A 3/2020
WO WO-2022108912 A1 5/2022

OTHER PUBLICATIONS

Abdar et al.: A review of uncertainty quantification in deep learning: Techniques, applications and challenges. Information Fusion 76:243-297 (2001).

(Continued)

*Primary Examiner* — Atiba O Fitzpatrick
(74) *Attorney, Agent, or Firm* — Wilson Sonsini Goodrich & Rosati

(57) ABSTRACT

An automated image quality control system is provided. The system comprises: a first component including a first deep learning network model for estimating a quality of medical images acquired by an imaging device; and a second component for determining whether the medical images are out of a distribution of a training dataset used for training the first deep learning network model.

19 Claims, 7 Drawing Sheets

Related U.S. Application Data

(60) Provisional application No. 63/117,330, filed on Nov. 23, 2020.

(52) U.S. Cl.
CPC .............. *G06T 2207/20092* (2013.01); *G06T 2207/30004* (2013.01); *G06T 2207/30168* (2013.01)

(58) Field of Classification Search
CPC ................... G06V 10/70; G06V 10/82; G06V 10/774–7796; G06V 10/454; G06V 20/653; G06V 10/754; G06K 9/6256; G06K 9/6257; G06K 9/6259; G06F 18/214–2155; G06F 7/023; G06F 40/16; G01N 29/4481
See application file for complete search history.

(56) References Cited

U.S. PATENT DOCUMENTS

| | | | | |
|---|---|---|---|---|
| 2016/0034809 | A1 | 2/2016 | Trenholm et al. | |
| 2017/0372155 | A1 | 12/2017 | Odry et al. | |
| 2018/0232878 | A1 | 8/2018 | Braun et al. | |
| 2018/0330511 | A1 | 11/2018 | Ha et al. | |
| 2018/0374193 | A1 * | 12/2018 | Park | G06T 7/11 |
| 2018/0374194 | A1 * | 12/2018 | Park | G06F 18/2178 |
| 2020/0410696 | A1 * | 12/2020 | Yan | G06N 3/08 |
| 2022/0012874 | A1 * | 1/2022 | Maier-Hein | G06T 7/254 |
| 2023/0377314 | A1 * | 11/2023 | Pezzotti | G06V 10/82 |
| 2023/0394652 | A1 * | 12/2023 | Pezzotti | G06T 7/0012 |

OTHER PUBLICATIONS

Daxberger et al.: Bayesian Variational Autoencoders for Unsupervised Out-of-Distribution Detection. arXiv preprint arXiv:1912. 05651, pp. 1-21 (2020).

European Patent Application No. EP 21895438.6 Extended European Search Report dated Dec. 10, 2024.

Padhy et al.: Revisiting One-vs-All Classifiers for Predictive Uncertainty and Out-of-Distribution Detection in Neural Networks. arXiv preprint arXiv:2007.05134, pp. 1-10 (2020).

Shen et al.: Multi-Domain Image Completion for Random Missing Input Data. IEEE Trans. Med. Imaging 40(4):1113-1122 (2021).

Karimi, et al. "Improving Calibration and Out-of-Distribution Detection in Medical Image Segmentation with Convolutional Neural Networks." arXiv preprint arXiv:2004.06569 (2020).

Kumar, et al., "Verified uncertainty calibration." Advances in Neural Information Processing Systems. 2019.

Lee et al. "A simple unified framework for detecting out-of-distribution samples and adversarial attacks." Advances in Neural Information Processing Systems. 2018.

Meding, et al., "Automatic detection of motion artifacts in MR images using CNNS." 2017 IEEE International Conference on Acoustics, Speech and Signal Processing (ICASSP). IEEE, 2017.

PCT/US2021/059480 International Search Report and Written Opinion dated Feb. 3, 2022.

Rousseeuw, Peter, "Least median of squares regression." Journal of the American Statistical Association 79.388 (1984): 871-880.

Shaw, et al. "A Heteroscedastic Uncertainty Model for Decoupling Sources of MRI Image Quality." arXiv preprint arXiv:2001.11927 (2020).

* cited by examiner

| | Baseline | Ours | MRIQC |
|---|---|---|---|
| Run-time (per 3D volume) | n/a | 1.6 s | >20 min |
| Average Precision | 0.08 | 0.88 | 0.12 |
| Accuracy (%) | 92 | 98 | 92 |

*FIG. 7*

AUTOMATED MEDICAL IMAGE QUALITY CONTROL SYSTEM

CROSS-REFERENCE TO RELATED APPLICATION

This application is a continuation of International Application No. PCT/US2021/059480 filed on Nov. 16, 2021, which claims priority to U.S. Provisional Application No. 63/117,330 filed on Nov. 23, 2020, the content of which is incorporated herein in its entirety.

BACKGROUND

Medical imaging plays vital role in health care. Various imaging modalities such as Positron Emission Tomography (PET), Magnetic Resonance Imaging (MRI), ultrasound imaging, X-ray imaging, Computed Tomography (CT) or a combination of these modalities aid in prevention, early detection, early diagnosis and treatment of diseases and syndromes. Image quality may be degraded, and the images may be contaminated with noise due to various factors such as physical limitation of the electronic devices, dynamic range limit, noise from the environment and the movement artifacts due to movement of patient during imaging. For example, subject motion during MRI acquisition can limit the diagnostic capacity of the images or lead to necessary rescans.

There is an ongoing effort to improve the quality of images and reduce various types of noise and various artifacts. Artificial intelligence or deep learning technology has been widely adopted to improve medical imaging quality. However, current systems may lack automation, real-time quality control and/or the capability to automatically adapt to various different applications while ensuring the imaging quality.

SUMMARY

A need exists for a fully automated real-time quality control system using deep learning techniques. Methods and systems are provided for automating medical imaging quality control in real-time. Methods and systems provided herein may provide an automated framework that employs machine learning or artificial intelligence techniques for medical imaging and automates the methods and processes from automated data collection to patient diagnosis. In particular, the present disclosure provides a robust quality control system or automated quality control framework that beneficially improves patient safety and reliability at every stage throughout the process.

The provided methods and systems may utilize or apply deep learning techniques to improve the efficiency and accuracy of a process that is designed to enhance image quality (e.g., mitigate imaging artifacts and removing various types of noise). For example, a fully automated real-time artifact detection software using deep learning is provided to enable fast and accurate detection of motion artifact affected T1-weighted structural MRI images. The automation methods and framework can beneficially be applied to any type of imaging modalities, imaging processes that employ deep learning techniques to mitigate artifacts. Examples of artifacts in medical imaging may include noise (e.g., low signal noise ratio), blur (e.g., motion artifact), shading (e.g., blockage or interference with sensing), missing information (e.g., missing pixels or voxels in painting due to removal of information or masking), and/or reconstruction (e.g., degradation in the measurement domain). The automation methods and framework can beneficially be applied to any type of imaging modalities such as Positron Emission Tomography (PET), Magnetic Resonance Imaging (MRI), ultrasound imaging, X-ray imaging, Computed Tomography (CT), ultrasound, other modalities or a combination of these modalities. Additionally, methods and systems of the disclosure may be applied to existing systems without a need of a change of the underlying infrastructure.

In one aspect, an automated image quality control system is provided. The automated image quality control system comprises: a first component including a first deep learning network model for estimating a quality of medical images acquired by an imaging device; and a second component configured for determining whether the medical images are out of a distribution of a training dataset used for training the first deep learning network model. In some instances, the second component is configured to compare the distance score with a threshold to determine whether the medical images are out of the distribution of the training dataset.

In some embodiments, the second component comprises a plurality of intermediate layers of the first deep learning network model. In some cases, determining whether the medical images are out of the distribution of the training dataset comprises generating a distance score based at least in part on a plurality of feature maps corresponding to the plurality of intermediate layers.

In some embodiments, the second component comprises an intermediate layer of the first deep learning network model. In some cases, the second component is configured to generate a distance score based at least in part on a feature map of the intermediate layer.

In some embodiments, upon determining one or more of the medical images are out of the distribution of the training datasets, the one or more of the medical images are not estimated by the first component. In some embodiments, the training dataset includes low quality image data simulated using high quality image data.

In some embodiments, the automated image quality control system further comprises a third component for estimating a registration quality. In some cases, estimating the registration quality comprises generating a score indicative of an alignment level between the medical images. In some instances, the medical images are acquired using different modalities or different acquisition parameters. In some instances, the score is generated using a second deep learning model. In some embodiments, the automated image quality control system further comprises a fourth component for calibrating the automated image quality control system to adapt to different tasks, sites, scanners, or quality standards. In some cases, calibrating the automated image quality control system is performed in response to a user input. Alternatively, calibrating the automated image quality control system is performed automatically without user intervention. In some cases, the fourth component is configured to distinguish between the different tasks, sites, scanners, or quality standards based at least in part on the registration quality estimated by the third component.

In some embodiments, the automated image quality control system further comprises a fifth component for generating real-time feedback for controlling an operation of the imaging device. In some embodiments, the real-time feedback comprises an instruction to the imaging device to reacquire a medical image with one or more recommended imaging parameters.

In a separate yet related aspect, a computer-implemented method for automating image quality control is provided.

The method comprises: providing a first component including a first deep learning network model for estimating a quality of medical images acquired by an imaging device; and providing a second component for determining whether the medical images are out of a distribution of a training dataset used for training the first deep learning network model.

In some embodiments, the second component comprises an intermediate layer of the first deep learning network model. In some cases, determining whether the medical images are out of the distribution of the training dataset comprises generating a distance score based at least in part on a feature map of the intermediate layer. In some instances, the method further comprises comparing the distance score with a threshold to determine whether the medical images are out of the distribution of the training dataset. In some cases, the second component comprises a plurality of intermediate layers of the first deep learning network model. In some instances, determining whether the medical images are out of the distribution of the training dataset comprises generating a distance score based at least in part on a plurality of feature maps corresponding to the plurality of intermediate layers.

In some embodiments, the method further comprises upon determining one or more of the medical images are out of the distribution of the training datasets, the one or more of the medical images are not estimated by the first component. In some embodiments, the training dataset includes low quality image data simulated using high quality image data.

In some embodiments, the method further comprises providing a third component for estimating a registration quality. In some cases, the method further comprises generating a score indicative of an alignment level between the medical images. In some cases, the medical images are acquired using different modalities or different acquisition parameters. In some cases, the score is generated using a second deep learning model.

In some cases, the method further comprises providing a fourth component for calibrating the automated image quality control system to adapt to different tasks, sites, scanners, or quality standards. In some cases, calibrating the automated image quality control system is performed in response to a user input. Alternatively, calibrating the automated image quality control system is performed automatically without user intervention. In some cases, the fourth component is configured to distinguish between the different tasks, sites, scanners, or quality standards based at least in part on the registration quality estimated by the third component.

In some embodiments, the method further comprises providing a fifth component for generating real-time feedback for controlling an operation of the imaging device. In some cases, the real-time feedback comprises an instruction to the imaging device to reacquire a medical image with one or more recommended imaging parameters.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7 shows an example of artifact detection result generated by the automated image quality control system.

DETAILED DESCRIPTION OF THE INVENTION

Figure 1:
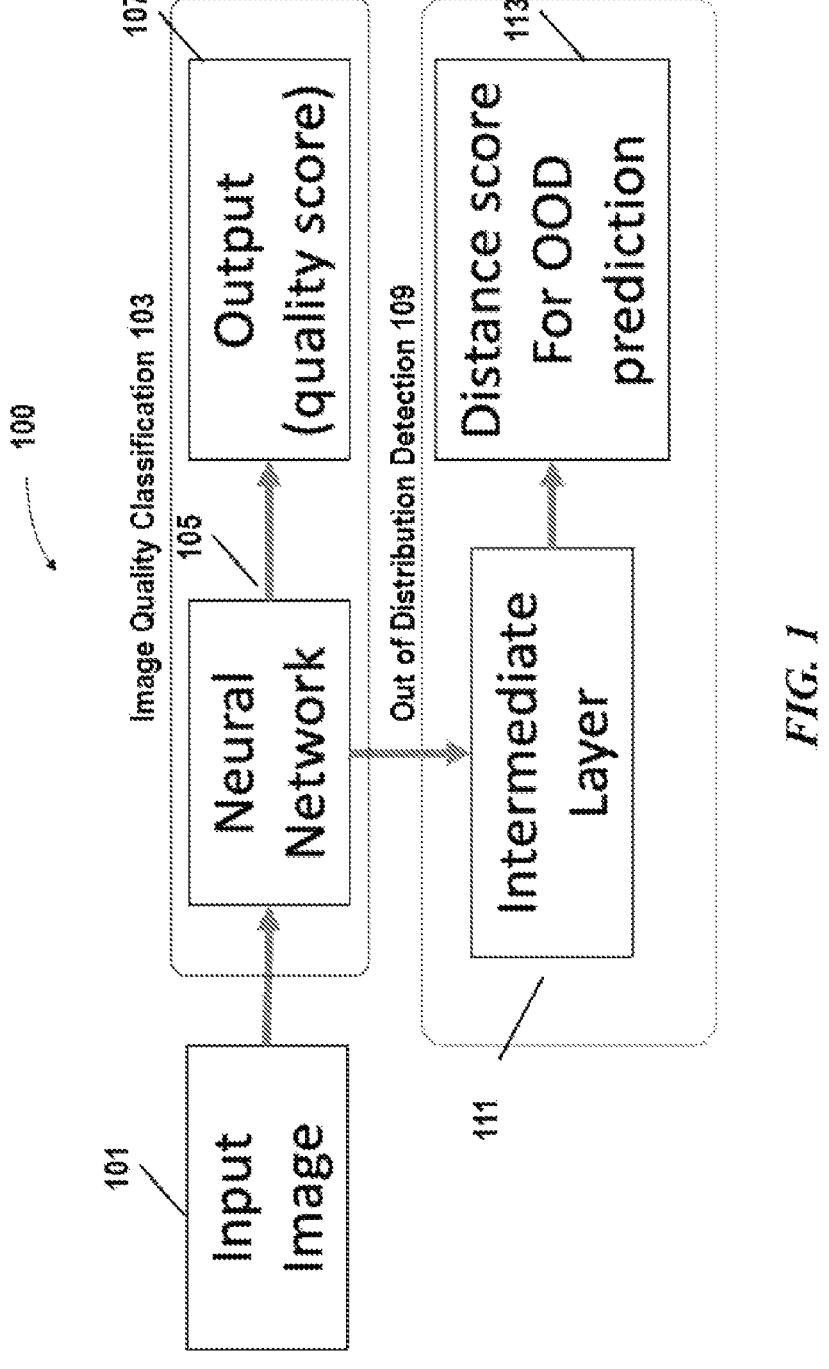
FIG. 1 shows an example of a quality control system, in accordance with some embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods that are capable of automating the process of medical image quality enhancement or artifacts detection in real-time. In particular, the provided systems and methods may provide an automated image quality control framework that can improve the accuracy and efficiency of image quality control. The image quality control framework may automatically control image quality without human intervention or with reduced human intervention.

The provided automated image quality control framework may be applied in improving image quality or artifacts detection in various aspects. For instance, the image quality control system may provide accurate and real-time image quality estimation, registration quality estimation, artifacts detection, low quality image detection, out-of-distribution (OOD) image detection, automatic control of imaging device based on real-time feedback information about artifacts detection and the like. Examples of low quality in medical imaging may include noise (e.g., low signal noise ratio), blur (e.g., motion artifact), shading (e.g., blockage or interference with sensing), missing information (e.g., missing pixels or voxels in painting due to removal of information or masking), reconstruction (e.g., degradation in the measurement domain), and/or under-sampling artifacts (e.g., under-sampling due to compressed sensing, aliasing).

It can be difficult to distinguish between anomalous (e.g., out-of-distribution (OOD) image) and in-distribution examples. The image quality control system herein may be capable of distinguishing OOD input images from low quality images thereby improving the accuracy of quality assessment.

Though magnetic resonance imaging (MRI) examples are described later herein, it should be understood that the present approach can be used in any imaging modality contexts. For instance, the presently described approach may be employed on data acquired by any types of tomographic scanners including, but not limited to, computed tomography (CT), single photon emission computed tomography (SPECT) scanners, functional magnetic resonance imaging (fMRI), or Positron Emission Tomography (PET) or other imaging modalities.

The methods and systems herein may be model agnostic. In some cases, the methods and systems can be applied regardless of the types or resources of image quality degradation. For instance, the provided methods and systems can automate any image quality control process without being limited to the sources of image quality degradation, or the specific deep learning models for downstream image processing.

Methods and systems herein may provide an automated image quality framework. In some embodiments, the automated image quality framework may comprise a mechanism to determine whether medical imaging data meet a pre-determined (e.g., satisfactory) quality, a mechanism for controlling the quality of image registration (e.g., alignment), a feature (e.g., OOD detection) that prevents the return of unexpected or unacceptable outputs from the image data processing system due to uncertainty estimations generated by the automated image quality control system, a mechanism enabling an imaging device (e.g., scanner) specific, site-specific, user-specific, or task-specific calibration of the quality control procedure, and/or a feature of real-time feedback control of the scanner based on the real-time image quality information.

In some cases, the automated image quality framework may comprise a mechanism (e.g., image quality estimation mechanism) to determine whether the medical imaging data meet a pre-determined (e.g., satisfactory) quality. The image quality estimation mechanism may also be referred to as image quality estimation component, image quality classifier or image quality classification component which can be used interchangeably throughout the specification. The mechanism may be capable of directly classifying the quality of the imaging data. For example, quality of the input imaging data may be predicted or classified before image reconstruction in the acquisition domain or after reconstruction in the image domain.

The mechanism for determining the imaging data quality may be employed at any stage of the process. For example, quality of the input image data may be estimated to determine whether a rescanning is needed if the quality is below a pre-determined threshold, or the quality of a processed image data (e.g., after enhancement) may be estimated to assess/evaluate the enhancement result.

In some cases, the mechanism for determining the imaging data quality may include a deep learning trained model or classifier. The output of the image quality classifier may be a quantitative indicator such as a score indicative of the quality of the imaging data, or a binary result indicating whether the quality of the imaging data meet a pre-determined quality or not (e.g., acceptable or unacceptable). Alternatively, the mechanism may include any suitable model for determining the image quality with or without machine learning techniques.

In some cases, the automated image quality framework or system may comprise a component for determinizing a quality of the registration. For example, the component may be a registration quality estimation component. In some cases, multiple images (e.g., with different contrast, dose, acquisition speed, etc.) may be acquired from the same subject and a registration algorithm such as nonlinear or affine co-registration algorithm may be applied to align the images. The registration quality estimation component may evaluate how well the registration algorithm adopted by the image data processing system has been able to align different images acquired from the same subject. As image registration is a crucial step that can affect the result of post-processing, the registration quality estimation component may beneficially ensure that the registration result meets a pre-determined quality thereby preventing/reducing unpredictable outputs. In some embodiments, the registration quality estimation component may include a machine learning algorithm trained model or classifier and the output of the mechanism may be a quantitative indicator such as a score indicative of the quality or level of the alignment, or a binary result indicating whether the quality of the alignment meet a pre-determined registration quality (e.g., acceptable or unacceptable). Alternatively, the registration quality estimation component may include any suitable models for determining the registration quality with or without machine learning techniques.

In some cases, the automated image quality framework or system may include a feature capable of identifying whether the input data to the quality control system is within or close to a distribution of the training dataset used to train the deep learning model (e.g., image quality classifier). In the case when the input data is outside of or deviated from the distribution of the training dataset, the one or more trained models of the quality control system or other post processing algorithms may produce unexpected results. This feature may identify out-of-(training)-distribution (OOD) input data or perform out-of-distribution detection. The feature may also be referred to as out-of-distribution detection (OOD) feature or OOD method which are used interchangeably throughout the specification. This may beneficially avoid the scenario where the neural network is trusted (e.g., model is not degraded or no concept drift), but the prediction result may be unreliable due to the input image being too far from the training data distribution (e.g. the input image may contain artifacts or sequence parameters that have not been seen by the model at training time). The out-of-distribution detection feature may include any suitable architecture or method for determining whether the input data is within the distribution of the training datasets. Details about the OOD method is described later herein.

In some cases, drastic changes in input data distributions may indicate serious model degradation. The out-of-distribution detection feature may also be capable of monitoring or tracking the difference between data used to train the model versus data that are being presented to the model to score. For instance, if the difference crosses a threshold or is drifting significantly, it may be an indicator of a model drift and degradation.

Typically, a machine learning model can learn any concepts that allow the model to be able to make predictions based on the training data distribution. A concept shift may occur when the expectations of what constitutes a correct prediction change over time even or according to a specific deployment environment/system though the distribution of the input data has not changed. For example, different users or different tasks may have different quality standards. The automated image quality framework or system may include a mechanism that can account for the difference between deployment sites, systems (e.g., scanners), tasks, users and the like. The mechanism may perform scanner-specific, site-specific, and/or task-specific calibration to adapt to different quality standards arising out of the different sites, scanners, users or tasks as described above.

In some cases, the automated image quality framework or system may include a real-time feedback mechanism for controlling the imaging hardware (e.g., scanner). For example, when the input imaging data is determined below a quality threshold (e.g., by the imaging data quality evaluation mechanism) or is detected to be out-of-distribution of the training datasets, the real-time feedback control mechanism may generate an instruction to the scanner to reacquire the image data using a different imaging protocol, adjusting one or more imaging parameters, or issue a warning or suggestion to a user to take appropriate action.

The automated image quality framework or system herein may comprise any one or more of the abovementioned features, mechanisms and components or a combination thereof. Any one of the aforementioned components or mechanisms can be combined with any other components. The one or more of the abovementioned features, mechanisms and components can be implemented as a standalone component or implemented as an integral component.

For example, in some embodiments, the automated image quality framework or system may comprise an image quality estimation component and a registration quality estimation component. In some cases, the image quality estimation component may include a neural network-based classifier. The neural network-based classifier (e.g., image quality classifier) may be trained to detect low quality images (e.g. images that have been corrupted by artifacts due to motion artifacts, radiofrequency (RF) artifacts and the like, or images with quality issues arising from hardware faults or improper imaging parameters) that may have low signal-to-noise ratio or other types of artifacts.

In a training stage, the neural network may be fed with training datasets including images of acceptable quality (e.g., quality above a pre-determined threshold) and unacceptable quality (e.g., quality below a pre-determined threshold) in pairs. The neutral network may learn to distinguish the different qualities or determine whether the quality is acceptable. Alternatively or additionally, the classifier may be trained to determine different quality scores.

In some cases, the training datasets may include augmented image data. For example, the poor (unacceptable) quality images may be simulated such as from good quality images or include real poor-quality images. Obtaining sufficient poor-quality training data can be challenging therefore accurate simulation based on the physics of image generation can be used to provide sufficient training data. Simulating poor quality images using good quality images may beneficially provide large volume of training datasets thereby improving the model accuracy and performance. In some cases, the simulated poor-quality data may be created in accordance with the physics of image generation, a mathematic model, physical deployment conditions, and other factors to ensure the accuracy of the simulated data. The output of the classifier may be a binary result indicating the image quality is acceptable or unacceptable. Alternatively or additionally, the output of the classifier may be a score indicative of different levels of image quality.

In some cases, a registration quality estimation component may include a neural network-based classifier. The neural network-based classifier (e.g., registration quality classifier) may be trained to assess the quality of alignment (e.g., alignment score, level of alignment, whether the level of alignment is acceptable or not) between multiple different images of the same subject (e.g., same target). The multiple different images may be images acquired using different modalities, different pulse sequences (e.g., contrast-weighted images such as T1-weighted (T1), T2-weighted (T2), proton density (PD) or Fluid Attenuation by Inversion Recovery (FLAIR), etc), different scans with different acquisition parameters and the like and such different images may be acquired for imaging the same subject or target scene. Similarly, during a training stage, the neural network may be fed with training datasets including images with poor alignment and images with good alignment in pairs. In some cases, the poor alignment image data may be simulated from good alignment images such as by deliberately misaligning or distorting the image such the input images are no longer well aligned.

In some cases, the image quality classifier may be combined with the out-of-(training)-distribution (OOD) detection feature such that the classifier may be capable of both detecting a low image quality and determining whether the image is out-of-(training)-distribution (OOD). The classifier may be trained to determine image quality and detect OOD image simultaneously. FIG. 1 shows an example of a quality control system 100. The quality control system 100 may comprise an image quality classification component 103 and an out of distribution detection component 109.

The out of distribution detection component 109 may detect input images (e.g., OOD samples) that are outside of a distribution of the training datasets. For instance, the system may comprise a discriminative model that is trained to directly distinguish between images of acceptable and unacceptable quality. The out of distribution detection component 109 beneficially detects when the discriminative model is uncertain about the image quality (e.g., output an uncertainty estimate) because it has not seen similar data in the training set.

In some cases, the out of distribution detection component 109 may comprise an intermediate layer 111 of the imaging quality neural network 105. This intermediate layer may include a final layer of the image quality neural network. Alternatively, the intermediate layer may include any intermediate layer of the image quality neural network that may or may not be the final layer. In some cases, the OOD component may include multiple intermediate layers selected from the imaging quality neural network 105. This may beneficially simplify the system such that a single neural network 105 may be utilized to perform multiple tasks or detect different types of artifacts.

The out of distribution detection component 109 may calculate a distance metric 113 between the intermediate layer and a distribution of this intermediate layer pre-calculated from the training data. The distance can be calculated using any suitable methods. For example, Mahalanobis distance (MD) to the closest class distribution may be used to calculate a distance metric (e.g., distance score):

$$y(x)=\arg_c\min(f(x)-\mu_c)^T\Sigma^{-1}(f(x)-\mu_c)$$

Where y is the Mahalanobis distance, c is the class, $\mu_c$ is the empirical mean of class c in the training data and $\Sigma$ is the covariance. In some cases, the Mahalanobis distance may be calculated using the maximum likelihood estimation of the covariance. In some cases, the aforementioned OOD detection method may be expanded by using point estimates of the mean and covariance (e.g. the Minimum Covariance Determinant estimator) instead of maximum likelihood estimation of the covariance. This may be beneficial as point estimates can be more robust whereas the maximum likelihood estimate can be extremely sensitive to outliers.

In some cases, when multiple intermediate layers are utilized, the hidden features of the corresponding intermediate layers are extracted, then for each OOD sample, a distance score from each of the multiple intermediate layers may be computed using the formula described above. The distance score may be calculated based at least in part on a plurality of feature maps corresponding to the plurality of intermediate layers. In some cases, the method may integrate the multiple distance scores for each layer (e.g., weighted average) to calculate the distance score.

The out of distribution detection component 109 may then detect OOD samples using the distance metric/score 113. For example, the distance score such as Mehalanobis distance (distance to the training data distribution as described above) may be used to determine whether the distance score is greater than certain threshold. For instance, if the distance score is above the threshold, the training sample may be flagged as out of distribution (OOD) or be marked as uncertain since it has not been seen before. In some cases, upon detection of OOD samples, the quality control system may generate a notification or warning message prior to proceeding with the subsequent automated post-processing. Alternatively or additionally, the quality control system may provide a recommendation with the post-processing results indicating the detection of OOD samples. For example, the recommendation may comprise a suggestion that the results of the automated quality control system is unreliable and human intervention is warranted/required.

In some cases, the method may comprise input pre-processing to make in-distribution (e.g., training dataset) and out-of-distribution samples more separable. In some cases, the method may employ a method to perturb the input image in the direction of a reduced Mehalanobis distance thereby improving within the distribution and OOD separation. For example, the method may be a fast gradient sign method which perturbs the normal input in the direction of the loss gradient. The fast gradient sign method is used to test how robust the predictions are to adversarial examples. In some cases, other perturbation methods such as data augmentation (e.g. image transformations such as translations, rotations etc.) may also be adopted for assessing OOD confidence. For example, the inference may be run multiple times with a set of transformed images in order to assess the variability of predictions. In some cases, the data augmentation and the fast gradient sign method may be used concurrently or combined.

The OOD feature may be combined with the image quality classifier 103 in various different ways. For example, the OOD process and the image quality estimation process can be performed sequentially or simultaneously. In some cases, the OOD feature may be combined with the image quality classifier 103 by filtering the input images 101 to be supplied to the image quality classifier using the OOD estimates. For instance, the OOD method/feature may be applied to the input images 101 to remove irrelevant images that distort the image quality classification prior to feeding the input image to the image quality classification component 103. For example, the input image data may include one or more slices that are outside of the field-of-view of interest (e.g. when imaging the brain, there may be several slices that are at the level of the mouth or neck), and such slices may be detected by the OOD component 109 and flagged as OOD. The one or more OOD slices may be excluded from the training dataset such that their contribution to the final image quality prediction (e.g., output quality score 107) is excluded. This may beneficially improve the accuracy of image quality estimation such that the output information 107 can be utilized to automatically adjust the corresponding imaging parameters for controlling of the imaging device.

The output 107 of the image quality classification may indicate the quality of image data. The image quality estimation may be performed before enhancing the image quality using a post-processing model (e.g., image enhancement model), while after image quality enhancement to evaluate the quality or at any stage. In some cases, the image quality estimation result may be utilized as real-time feedback for automatically controlling the operation of the imaging device. For example, based on the quality score (e.g., below a threshold), one or more acquisition parameters may be adjusted to affect the control of the imaging device. The provided system may improve the accuracy of the image quality estimation by distinguishing OOD samples (input image) from the low-quality images as described above.

Figure 2:
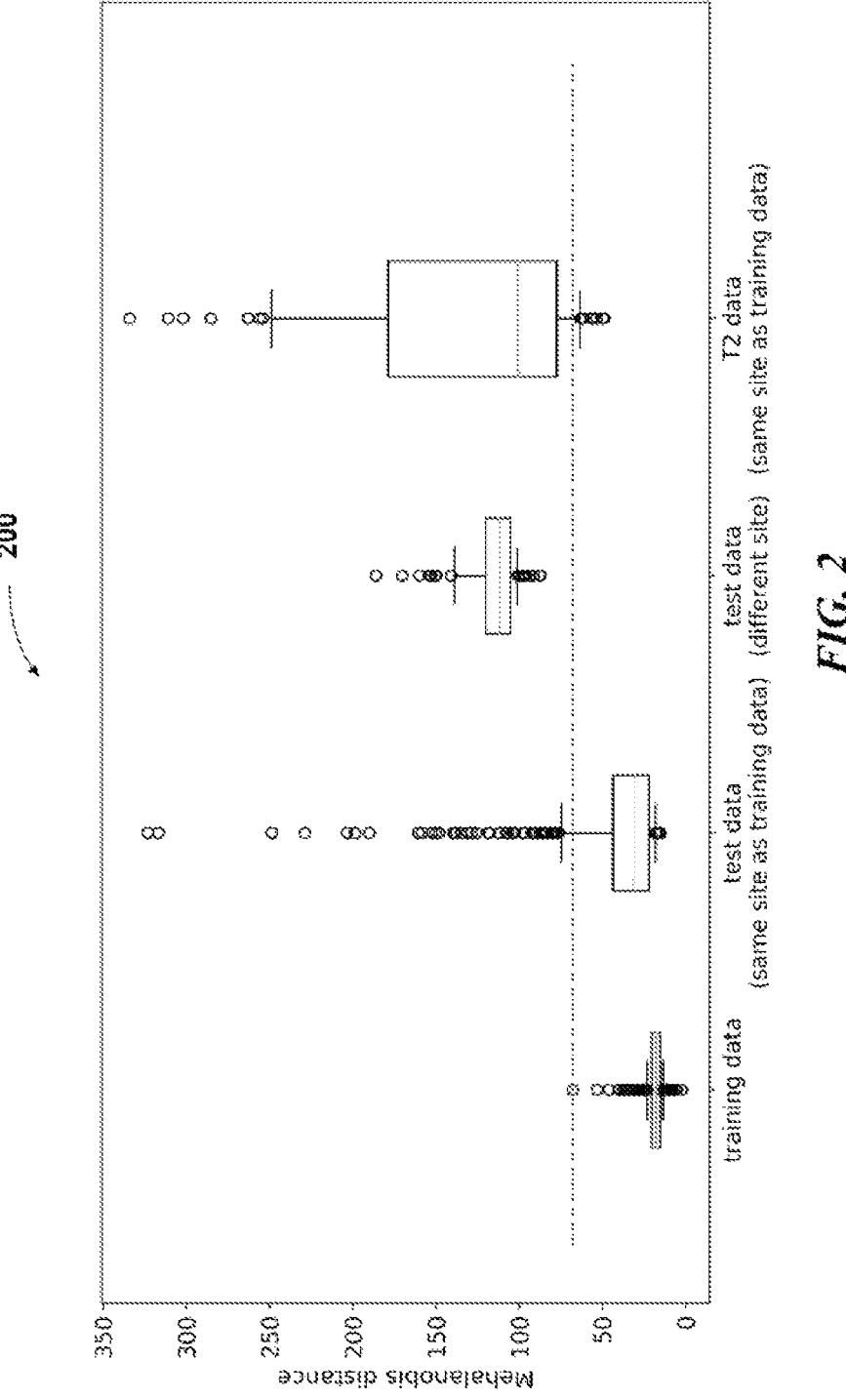
FIG. 2 shows an example of out of distribution detection result, in accordance with embodiments of the disclosure.

FIG. 2 shows an exemplary result of out-of-distribution detection. In the illustrated example, the distance score may be the Mahalanobis distance. In the illustrated example, the Mahalanobis distance is generated from the final layer of an image quality neural network. The example includes four different datasets: the training dataset, test dataset using data acquired from the same site as the training data, the test dataset from data acquired from a different site as the training data, and images from a different imaging modality (T2). The boxes indicate the first and third quartiles, while the whiskers indicate the $10^{th}$ and $90^{th}$ percentiles. The dash line shows an example of a potential threshold that can be used for OOD detection. This threshold means all of the training data and almost 90% of the test data (from the same site as the training data) will be classified as within distribution. All of the test data acquired from a different site and almost 90% of the data that is of a different modality from the same site will be classified as OOD.

The results illustrated in the example demonstrate that the OOD method can effectively detect the data samples (e.g., test data from different site, T2 data) acquired from different sites, using different imaging protocols, and/or identify them as not within the training dataset distribution. The results illustrated in the example also shows that the OOD features is capable of determining whether the input images are within a distribution of the training dataset (e.g., same imaging site and same modality (T1-weighted MRI)) with a high degree of accuracy such that the prediction result can be trusted.

As described above, the automated image quality framework or system may include a mechanism that can account for the difference between deployment sites, systems (e.g., scanners), tasks, users and the like. The mechanism may perform scanner-specific, site-specific, and/or task-specific calibration to adapt to different quality standards arising out of the different sites, scanners, users or tasks as described above.

As different imaging devices can produce different quality images and/or the quality of a medical image can be task dependent, a calibration capability is critical to ensure that the sensitivity of the quality control system is well adjusted to various applications and deployment conditions. In some cases, the calibration feature may be implemented based on user feedback. For example, user feedback may be requested to generate image quality labels. For instance, when images are flagged as low quality by the system, a user may provide input indicating whether the image quality is low quality or is actually satisfactory for the given goal or task thereby adjusting the sensitivity of the system to the given task.

Alternatively or additionally, the calibration feature may be implemented automatically without user interaction. For example, the system may adjust image quality labels based on the quality metrics from downstream processing such as by assessing the image registration quality or segmentation quality using the classifiers as described elsewhere herein. For instance, based on the image registration quality, the image quality labels may be adjusted to distinguish between different scanner types, sites and/or tasks. In some cases, after a database of scanner specific or task-specific labels has been built up, the model can be further recalibrated using methods such as Platt scaling or histogram binning based methods as new data are available or upon a change in the scanners, sites, tasks or desired goals.

Figure 3:
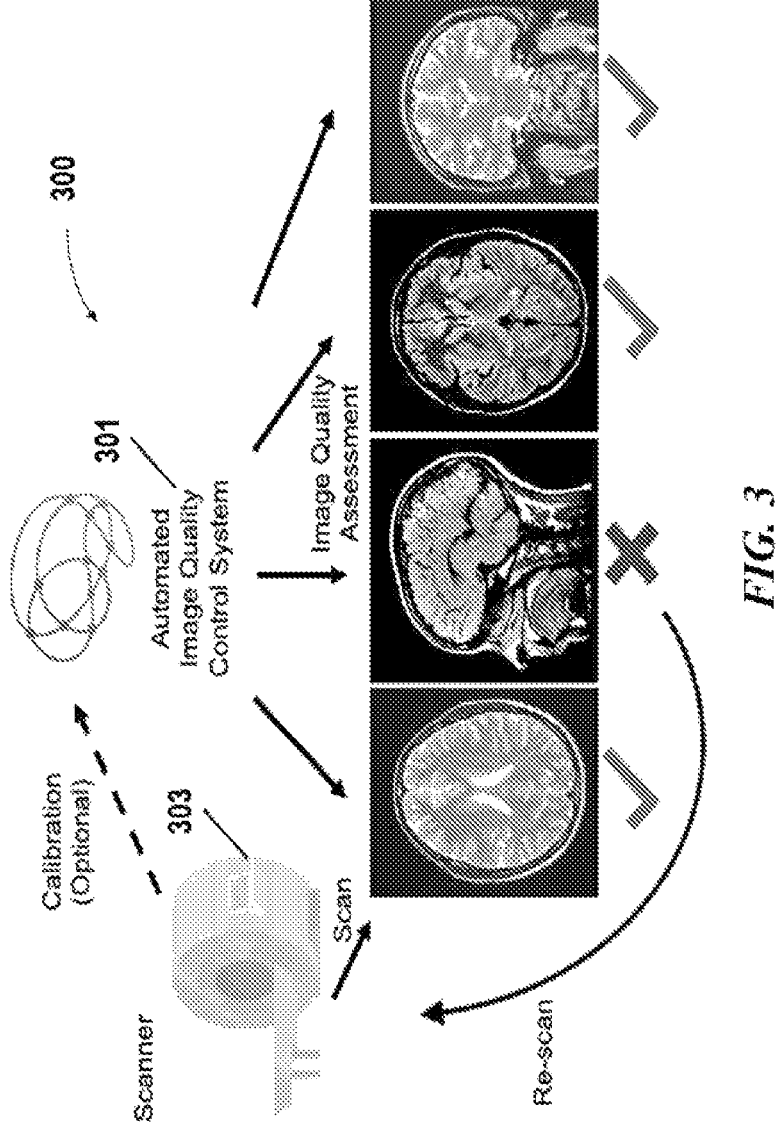
FIG. 3 shows an example of an automated image quality control system utilized for live scanning.

As described above, the automated image quality framework or system may include a real-time feedback mechanism for controlling the imaging apparatus. FIG. 3 shows an example 300 of an automated image quality control system 301 utilized for live scanning. The automated image quality control system 301 may comprise a real-time feedback mechanism providing real-time feedback about image data quality. In some cases, the real-time feedback may comprise recommended imaging parameters for the imaging device to reacquire an medical image. For example, during image acquisition or immediately after the image has been acquired, the quality control feedback mechanism may generate feedback based on the image quality result (e.g., quality score, registration quality, etc.) received from the image quality estimation component and/or the registration quality estimation component. The feedback may comprise instructions to directly adjust an operation of the scanner 303. For example, the instructions may instruct the scanner to perform a rescanning with one or more imaging parameters (e.g., scanning time, field of view, region-of-interest (ROI), contrast, sequence, etc.). For instance, the instruction may include reacquiring the entire image using a different sequence (e.g., a sequence that is more robust to the cause of the low-quality data) or partially reacquiring the data (e.g., in a specific ROI, with a given scanning speed) in which frequency domain lines have been affected by artifact. In some cases, the feedback may comprise a notification or suggested action delivered to a user.

Figure 4:
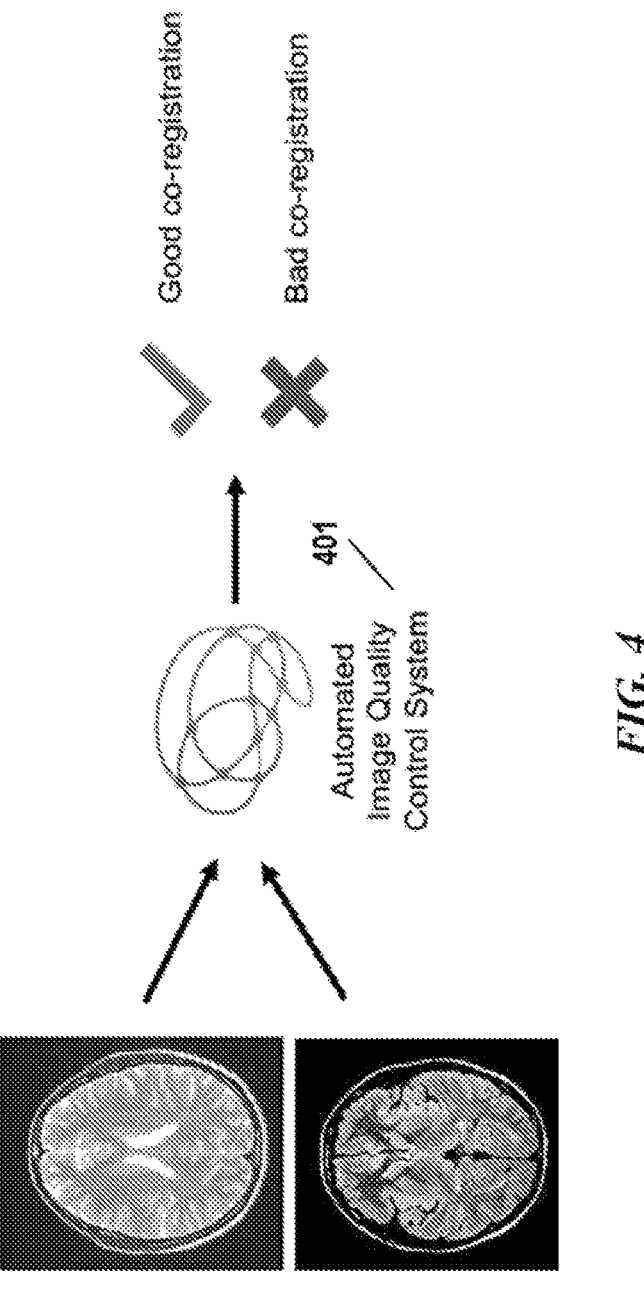
FIG. 4 shows an example of an automated image quality control system.

FIG. 4 shows an example of an automated image quality control system 401. As described above, the automated image quality control system 401 may have an automated calibration mechanism to adjust image quality labels based on the quality metrics from downstream processing result (e.g., the image registration or segmentation quality generated using the classifiers).

Figure 5:
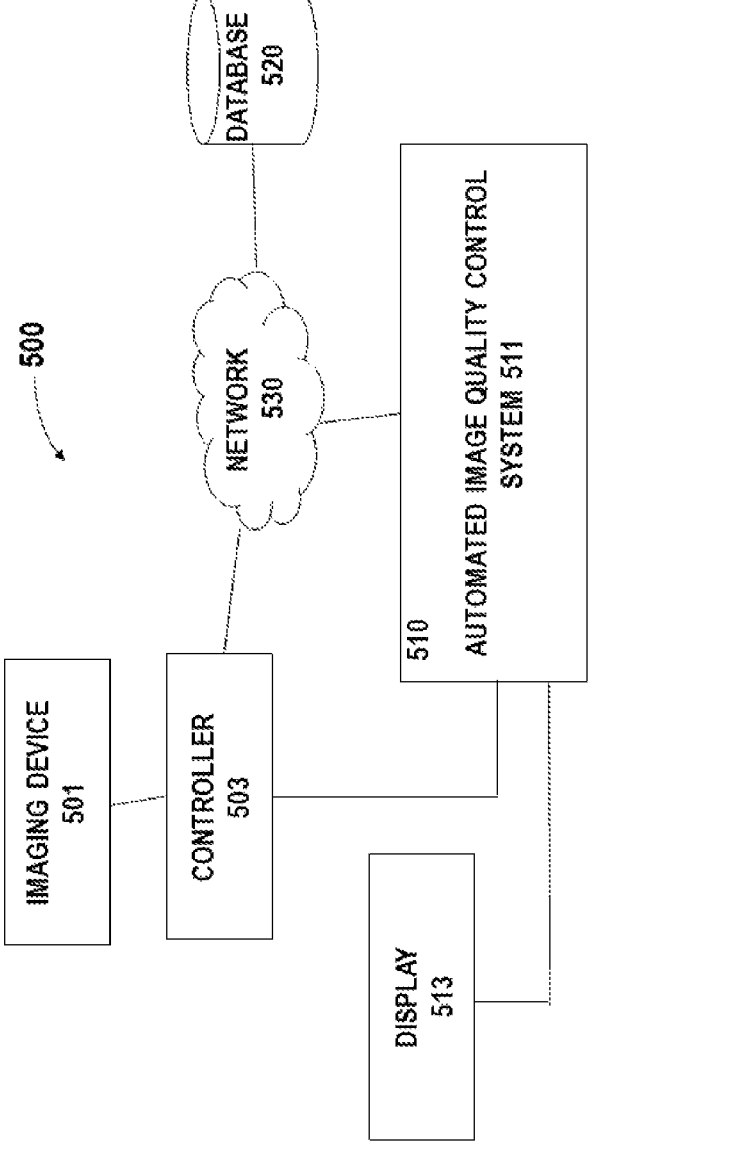
FIG. 5 schematically illustrates an automated image quality control system implemented on an imaging platform for real-time image quality control.

The systems and methods can be implemented on existing imaging systems without a need of a change of hardware infrastructure. FIG. 5 schematically illustrates an automated image quality control system 511 implemented on an imaging platform 500 for real-time image quality control. Image quality evaluation and feedback control may be performed in real-time during acquisition. For instance, image acquisition parameters of the imaging device 501 may be adjusted in real-time as image frame being captured by the imaging device. The imaging platform 500 may comprise a computer system 510 and one or more databases 520 operably coupled to a controller 503 over the network 530. The computer system 510 may be used for implementing the methods and systems consistent with those described elsewhere herein to evaluate image quality and generate feedback information in real-time. The computer system 510 may be used for implementing the automated image quality control system 511. The automated image quality control system 511 can be the same as those as described elsewhere herein. Although the illustrated diagram shows the controller and computer system as separate components, the controller and computer system (at least some components of the automated image quality control system) can be integrated into a single component.

The automated image quality system may comprise or be coupled to a user interface. The user interface may be configured to receive user input and output information to a user. The user interface may output a real-time feedback generated by the system. For example, an image quality score, detected poor alignment, out-of-distribution images or recommended actions for improving image quality may be presented to a user on the user interface. The user input may be related to controlling or setting up an image acquisition scheme when a user is presented with the real-time feedback generated by the system. For example, the user input may indicate scan duration (e.g., the min/bed) for each acquisition, sequence, ROI or scan time for a frame that determines one or more acquisition parameters for an acquisition scheme. The user interface may include a screen 513 such as a touch screen and any other user interactive external device such as handheld controller, mouse, joystick, keyboard, trackball, touchpad, button, verbal commands, gesture-recognition, attitude sensor, thermal sensor, touch-capacitive sensors, foot switch, or any other device.

In some cases, the user interface may comprise a graphical user interface (GUI) allowing a user to select an operation mode, acquisition parameters, and view feedback information, image quality result, registration quality, OOD detection and various other information as described elsewhere herein. In some cases, the graphical user interface (GUI) or user interface may be provided on a display 513. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through an application (e.g., via an application programming interface (API) executed on the local computer system or on the cloud). The display may be on a user device, or a display of the imaging system.

The imaging device 501 may acquire image frames using any suitable imaging modalities live video or image frames may be streamed in using any medical imaging modality such as but not limited to CT, fMRI, SPECT, PET, ultrasound, etc. Image quality of the captured live video or image data stream may be degraded due to, for example, low temporal resolution or reduction in radiation dose or presence of noise in imaging sequence. The captured video stream may be low-quality such as low image resolution, low temporal resolution, low contrast, or low signal to noise ratio (SNR).

The controller 503 may be in communication with the imaging device 501, one or more displays 513 and the automated image quality control system 511. For example, the controller 503 may be operated to provide the controller information to manage the operations of the imaging system, according to installed software programs. The controller 503 may be coupled to the real-time feedback component of the automated image quality control system to adjust the one or more operation parameters of the imaging device based on the real-time feedback.

The controller 503 may comprise or be coupled to an operator console which can include input devices (e.g., keyboard) and control panel and a display. For example, the controller may have input/output ports connected to a display, keyboard and other I/O devices. In some cases, the operator console may communicate through the network with a computer system that enables an operator to control the production and display of live video or images on a screen of display. The image frames displayed on the display may be processed by the automated image quality control system 511 and have improved quality.

The automated image quality control system 511 may comprise multiple components as described above. For example, automated image quality control system 511 may comprise a mechanism to ensure medical imaging data meet a pre-determined (e.g., satisfactory) quality, a mechanism for controlling the quality of image registration (e.g., alignment), a feature that prevents the return of unexpected or unacceptable outputs from the image data processing system due to uncertainty estimations generated by the automated image quality control system, a mechanism enabling an imaging device (e.g., scanner) specific or site-specific calibration of the quality control procedure, and/or a feature of real-time feedback control of the scanner based on the real-time image quality information. In some embodiments, the automated image quality control system may also comprise a training module configured to develop and train a deep learning framework using training datasets. In some cases, the automated image quality control system may further be configured for continual training, generating and preparing training datasets, and managing deep learning models.

The training module may be configured to train a deep learning model. In some embodiments, the training module may be configured to train a plurality of deep learning models for estimating the image quality, registration quality with the capability to automatically adapt to different sites, devices, quality standards, or other conditions. The training module may train the plurality of deep learning models individually. Alternatively or in addition to, the plurality of deep learning models may be trained as an integral model.

The training module may be configured to generate and manage training datasets. For example, the training datasets for training the classifier for image quality or registration quality estimation may comprise pairs of poor (unacceptable) quality images and high quality (acceptable) images, pairs of poorly aligned images and well aligned images.

The training module may be configured to train classifier for estimating image quality or registration quality. For example, the training module may employ supervised training, unsupervised training or semi-supervised training techniques for training the model. The training module may be configured to implement the machine learning methods as described elsewhere herein. The training module may train a model off-line. Alternatively or additionally, the training module may use real-time data as feedback to refine the model for improvement or continual training.

The deep learning model can employ any type of neural network model, such as a feedforward neural network, radial basis function network, recurrent neural network, convolutional neural network, deep residual learning network and the like. In some embodiments, the machine learning algorithm may comprise a deep learning algorithm such as convolutional neural network (CNN). The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers, and ends with output/final layer. The hidden or intermediate layers may act as learnable feature extractors, while the output layer may output a scalar classification score or regression score. Each layer of the neural network may comprise a number of neurons (or nodes). A neuron receives input that comes either directly from the input data (e.g., low quality image data, multiple images from same subject, etc.) or the output of other neurons, and performs a specific operation, e.g., summation. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof.

The computer system 510 may be programmed or otherwise configured to implement the one or more components of the automated quality control system 511. The computer system 510 may be programmed to implement methods consistent with the disclosure herein.

The imaging platform 500 may comprise computer systems 510 and database systems 520, which may interact with the automated quality control system 511. The computer system may comprise a laptop computer, a desktop computer, a central server, distributed computing system, etc. The processor may be a hardware processor such as a central processing unit (CPU), a graphic processing unit (GPU), a general-purpose processing unit, which can be a single core or multi core processor, or a plurality of processors for parallel processing. The processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

The computer system 510 can communicate with one or more remote computer systems through the network 530. For instance, the computer system 510 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 510 or the automated quality control system via the network 530.

The imaging platform 500 may comprise one or more databases 520. The one or more databases 520 may utilize any suitable database techniques. For instance, structured query language (SQL) or "NoSQL" database may be utilized for storing image data, collected raw data, image quality result, registration result, enhanced image data, training datasets, trained model (e.g., hyper parameters), user specified parameters (e.g., window size), etc. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present disclosure is implemented as a data-structure, the use of the database of the present disclosure may be integrated into another component such as the component of the present disclosure. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

The network 530 may establish connections among the components in the imaging platform and a connection of the imaging system to external systems. The network 530 may comprise any combination of local area and/or wide area networks using both wireless and/or wired communication systems. For example, the network 530 may include the Internet, as well as mobile telephone networks. In one embodiment, the network 530 uses standard communications technologies and/or protocols. Hence, the network 530 may include links using technologies such as Ethernet, 802.11, worldwide interoperability for microwave access (WiMAX), 2G/3G/4G/5G mobile communications protocols, asynchronous transfer mode (ATM), InfiniBand, PCI Express Advanced Switching, etc. Other networking protocols used on the network 530 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.
MRI Example The presently described approach may be employed on data acquired by a variety types of tomographic scanners including, but not limited to, computed tomography (CT), single photon emission computed tomography (SPECT) scanners, functional magnetic resonance imaging (fMRI), or magnetic resonance imaging (MRI) scanners. In MRI multiple pulse sequences (also known as image contrast) are usually acquired. However, subject motion during MRI acquisition can limit the diagnostic capacity of the images or lead to necessary rescans. The automated image quality control system as described herein can also be easily applied in MRI to enhance the image quality and perform real-time artifact detection.

Figure 6:
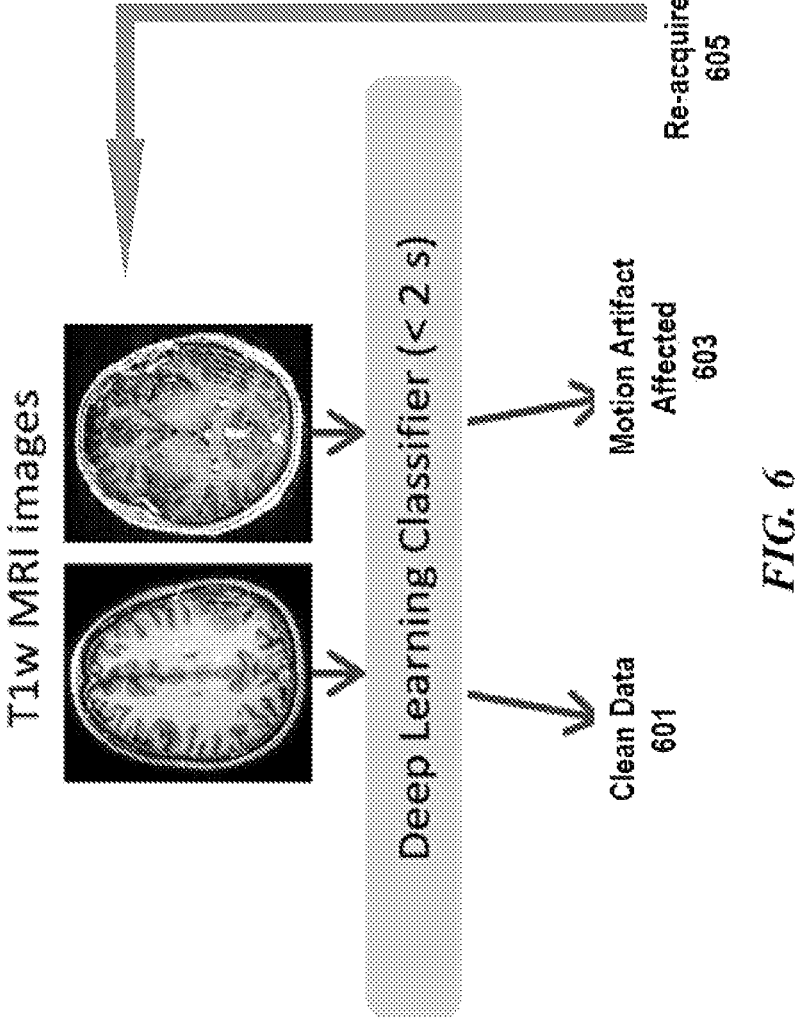
FIG. 6 shows an example of the deep learning-based motion artifact classifier applied in MRI.

FIG. 6 shows an example of the deep learning-based motion artifact classifier applied in MRI. In the example, with IRB approval and patient consent, 536 clinical 3D T1w MRI datasets from multiple institutions and scanners were retrospectively identified. Using the automated image quality control system, 85 datasets were labeled as significantly affected by motion artifacts. The automatic motion artifact detection may be performed by the image quality control system described above. To test the generalizability of the developed deep learning method, 61 datasets (5 of which were labeled with severe motion artifact) from a separate institution were identified. The deep learning classifier of the image quality control system as described above identified motion artifact affected images 603 from the clean data 601 (without motion artifact) and generate instruction 605 to re-acquire the T1 w images. The deep learning approach was compared against a baseline classifier which predicted the most common class for every image.

FIG. 7 shows a result of the artifact detection compared against a state-of-the-art MRIQC software package using average precision (area under the precision-recall curve), classification accuracy and run-time as performance metrics. In terms of artifact detection performance, the MRIQC classifier resulted in an average precision of 0.12 and an accuracy of 92%, which marginally surpassed the performance of a baseline classifier which had an average precision of 0.08 (FIG. 1). The result generated by the image quality estimation component combined with OOD feature has an average precision of 0.88 and 98% accuracy. In addition, the total computation time to process all subjects was 79 s (1.6 s per 3D volume) which is significantly faster than the MRIQC software, which took 79 minutes to process all 61 subjects using 61 CPU threads in parallel. The results demonstrate the real-time run-time capability of the automated image quality control system. The result also shows the system is capable of providing feasibility of fast and accurate detection of motion artifact in low-quality MRI images and the system can be well adapted to new site data and outperforms the state-of-the-art MRIQC method both in terms of speed and classification performance.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An automated image quality control system comprising:

(a) a first component including a first deep learning network model trained to output a quality score indicative of a quality level of medical images acquired by an imaging device, wherein the medical images are at least one of the following imaging modalities: Positron Emission Tomography (PET), Magnetic Resonance Imaging (MRI), ultrasound, X-ray imaging, Computed Tomography (CT) and wherein the first deep learning network model comprises a plurality of intermediate layers;

(b) a second component implemented by one or more of the plurality of intermediate layers, wherein the second component is trained to detect one or more of the medical images are out of a distribution of a training dataset used for training the first deep learning network model (out-of-distribution) thereby distinguishing an anomalous caused by out of the distribution from a low quality of the input medical images; and (c) a controller in communication with the imaging device, and upon receiving the quality score from the first component or a detection of the out-of-distribution from the second component, automatically adjust one or more acquisition parameters for acquiring medical images using the imaging device.

2. The automated image quality control system of claim 1, wherein the second component is configured to detect the out-of-distribution using one or more intermediate layer activations of the first deep learning network model during the same forward pass of the first deep learning network model that produces the quality score.

3. The automated image quality control system of claim 2, wherein the second component is configured to (i) extract one or more feature maps from the one or more intermediate layers, (ii) for each extracted feature map generate a distance equal to a Mahalanobis distance metric between the feature map and a corresponding reference distribution of feature-map activation previously obtained from the training dataset used to train the first deep learning network model.

4. The automated image quality control system of claim 3, wherein the second component is configured to further (iii) compute a combined distance score as a weighted sum of the computed Mahalanobis distance metrics, and (iv) compare the combined distance score with a threshold to determine whether the medical images are out of the distribution of the training dataset.

5. The automated image quality control system of claim 1, wherein the training dataset excludes medical images that are out of distribution.

6. The automated image quality control system of claim 1, wherein upon detecting one or more of the medical images are out of the distribution of the training dataset, the one or more of the medical images are removed from the medical images to be processed by the first component.

7. The automated image quality control system of claim 1, wherein the training dataset includes low quality image data simulated using high quality image data.

8. The automated image quality control system of claim 4, further comprising a third component for estimating a registration quality.

9. The automated image quality control system of claim 8, wherein estimating the registration quality comprises generating a score indicative of an alignment level between the medical images.

10. The automated image quality control system of claim 9, wherein the medical images are acquired using different acquisition parameters.

11. The automated image quality control system of claim 9, wherein the score is generated using a second deep learning model.

12. The automated image quality control system of claim 8, further comprising a fourth component for calibrating the automated image quality control system to adapt to different tasks, sites, scanners, or quality standards.

13. The automated image quality control system of claim 12, wherein calibrating the automated image quality control system comprises receiving a user input indicative of site-specific, scanner-specific, or task-specific quality preferences and, in response to the received user input, adjusting at least one of: a threshold used by the second component to detect the out-of-distribution, a weight used to compute the combined distance score, and a mapping between the quality score and a recommended acquisition parameter.

14. The automated image quality control system of claim 12, wherein calibrating the automated image quality control system is performed automatically without user intervention.

15. The automated image quality control system of claim 12, wherein the fourth component is configured to distinguish between the different tasks, sites, scanners, or quality standards based at least in part on the registration quality estimated by the third component and selects a corresponding pre-calibrated parameter set for the first deep learning network model from a plurality of stored calibration parameter sets.

16. The automated image quality control system of claim 1, wherein the controller comprises a fifth component for generating real-time feedback for adjusting the one or more acquisition parameters.

17. The automated image quality control system of claim 16, wherein the real-time feedback comprises an instruction to the imaging device to reacquire a medical image with the one or more adjusted acquisition parameters.

18. A computer-implemented method for automating image quality control comprising:

(a) providing a first component including a first deep learning network model trained to output a quality score indicative of a quality level of medical images acquired by an imaging device, wherein the medical images are at least one of the following imaging modalities: Positron Emission Tomography (PET), Magnetic Resonance Imaging (MRI), ultrasound, X-ray imaging, Computed Tomography (CT) and wherein the first deep learning network model comprises a plurality of intermediate layers;

(b) providing a second component implemented by one or more of the plurality of intermediate layers, wherein the second component is trained to detect one or more of the medical images are out of a distribution of a training dataset used for training the first deep learning network model (out-of-distribution) thereby distinguishing an anomalous caused by out of the distribution from a low quality of the input medical images; and (c) upon receiving, by a controller in communication with the imaging device, the quality score from the first component or a detection of the out-of-distribution from the second component, automatically adjusting one or more acquisition parameters for acquiring medical images using the imaging device.

19. The computer-implemented method of claim 18, wherein the second component is configured to detect the out-of-distribution using one or more intermediate layer activations of the first deep learning network model during the same forward pass of the first deep learning network model that produces the quality score.

*    *    *    *    *